United States Patent
Kazaoka et al.

[11] 3,848,888
[45] Nov. 19, 1974

[54] SEATBELT RETRACTOR

[75] Inventors: Kenichi Kazaoka, Nagoya; Kimiharu Hirose, Oobu; Hisao Matsumoto, Chita; Yasuo Takeshita, Toyota, all of Japan

[73] Assignee: Aisin Seiki Kabushiki Kaisha, Aichi Pref., Japan

[22] Filed: Sept. 25, 1972

[21] Appl. No.: 292,152

[30] Foreign Application Priority Data

Sept. 25, 1971 Japan.............................. 46-74914

[52] U.S. Cl. .......................................... 280/150 SB
[51] Int. Cl. ............................................. B60r 21/02
[58] Field of Search .............................. 280/150 SB

[56] References Cited
UNITED STATES PATENTS

| | | |
|---|---|---|
| 3,583,726 | 6/1971 | Lindblad ...................... 280/150 SB |
| 3,680,883 | 8/1972 | Keppel et al. .................. 280/150 SB |
| 3,692,328 | 9/1972 | Arlauskas...................... 280/150 SB |

*Primary Examiner*—Leo Friaglia
*Assistant Examiner*—Randall A. Schrecengost
*Attorney, Agent, or Firm*—Oblon, Fisher, Spivak, McClelland & Maier

[57] ABSTRACT

A seatbelt retractor for a vehicle comprising a seatbelt reeling-up means biased in a belt retracting direction and a belt-extending locking means movable in response to the opening or closing motion of a vehicle door so as to automatically lock movement of the reeling-up means in a belt-extending direction when the door is closed.

5 Claims, 8 Drawing Figures

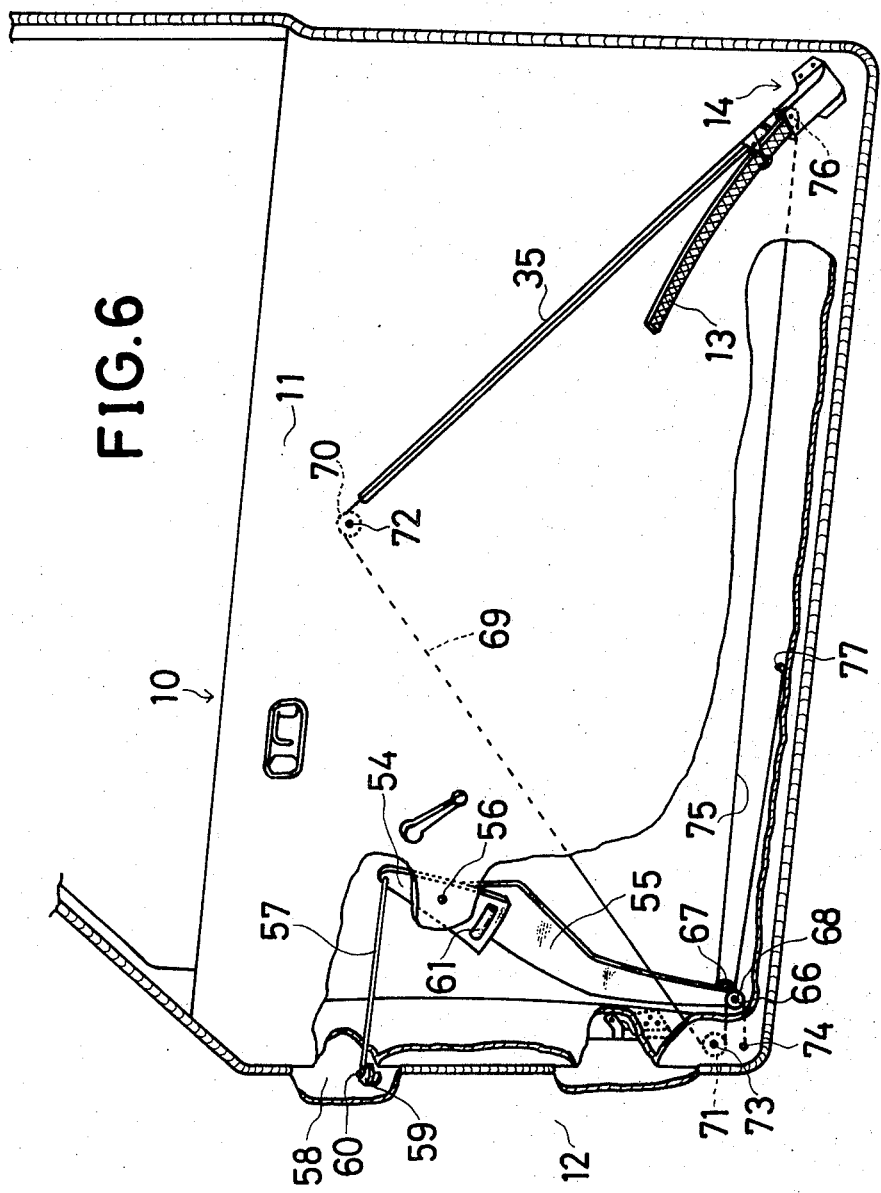

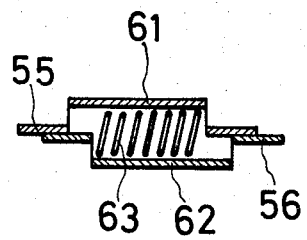
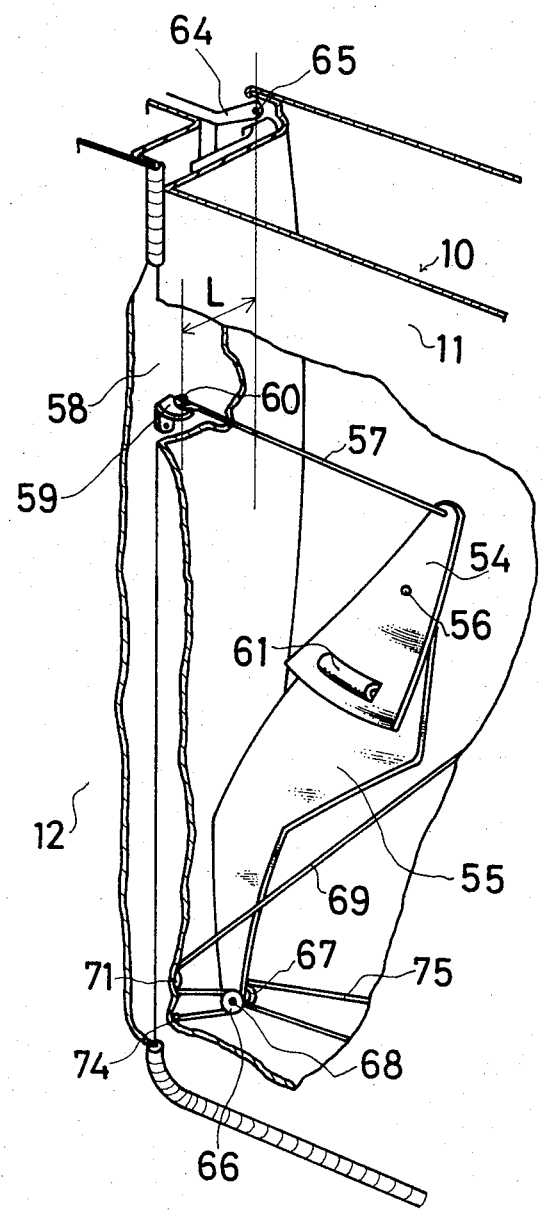
FIG. 8
FIG. 7

SEATBELT RETRACTOR

BACKGROUND OF THE INVENTION

The present invention relates generally to seatbelt retractors for vehicles and more particularly to an improved seatbelt retractor of the automatic locking type for reliably supporting and holding a passenger in the vehicle seat.

Conventionally, seatbelt retractors which comprise a seatbelt reeling-up device and a seatbelt-extending locking means to lock the seatbelt in its retracting position have been proposed. However, such locking means usually employ an inertia member, such as a pendulum or the like, which is adapted to have the relative position thereof changed as a function of the deceleration of the vehicle speed. Namely, when the deceleration of the vehicle speed exceeds a predetermined value, the inertia member will be actuated to restrain rotation of the reeling-up device. However, when the vehicle runs on and along a sloped road surface, such inertia member is subjected to a gravity action, so that accurate vehicle deceleration will not be sensed, and especially when the vehicle rolls up a sloped road surface, the conventional seatbelt will not be locked in its fully retracted position unless the inertia member is subjected to a very large vehicle deceleration. In other words, prior seatbelt retractors still have a drawback wherein supporting and holding of the occupant in the seat is not always reliable when the vehicle collides with another vehicle or the like.

SUMMARY OF THE INVENTION

It is, therefore, an object of the present invention to provide an improved seatbelt retractor obviating the above-mentioned drawbacks.

It is another object of the present invention to provide an improved seatbelt retractor wherein movement of the reeling-up means in a belt-extending direction is locked automatically when the vehicle door is closed.

It is a further object of the present invention to provide an improved seatbelt retractor wherein the extension of the seatbelt is locked when the door is closed and upon opening of the door the reeling-up means is brought into a position in which extension of the seatbelt is possible.

It is a still further object of the present invention to provide an improved seatbelt retractor wherein the relative position of a holder of the seatbelt is changed in response to the opening or closing of the door so that the passenger can get in and out without substantial obstruction.

BRIEF DESCRIPTION OF THE DRAWINGS

These and further objects, features and attendant advantages of the present invention will be more fully appreciated as the same becomes better understood from the following detailed description when considered in connection with the accompanying drawings in which like reference numerals designate like or corresponding parts throughout the several figures, and wherein:

FIG. 6 is a partially broken away perspective view showing the vehicle body and the door with parts mounted thereon;

FIG. 7 is an enlarged partially broken-away view of a portion of FIG. 6; and

FIG. 8 is a cross-sectional view taken along the line 8—8 of FIG. 7.

DETAILED DESCRIPTION OF THE ILLUSTRATED EMBODIMENT

Figure 1:
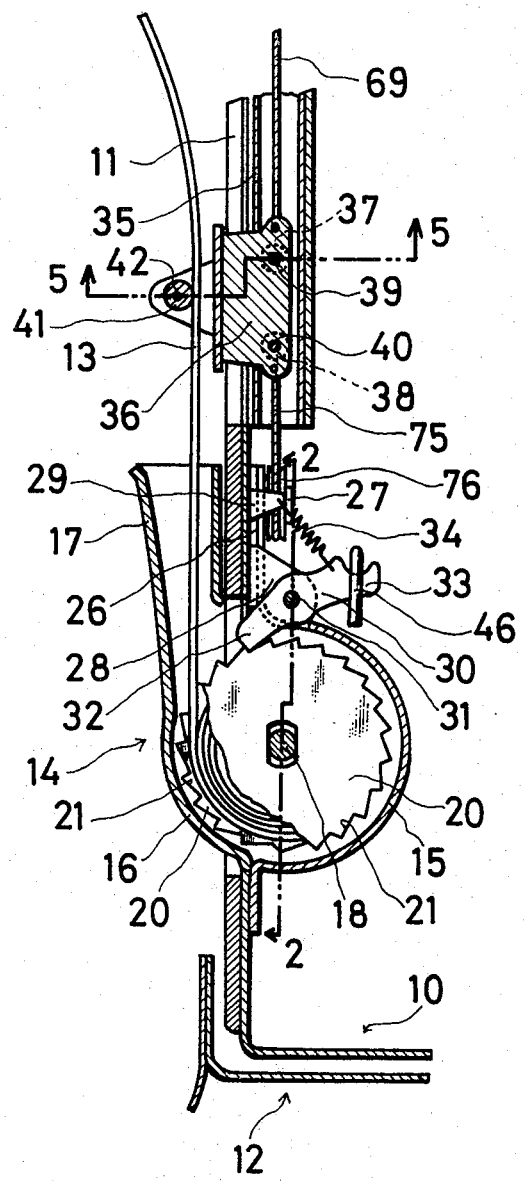
FIG. 1 is a cross-sectional view showing one embodiment of the present invention.
Figure 2:
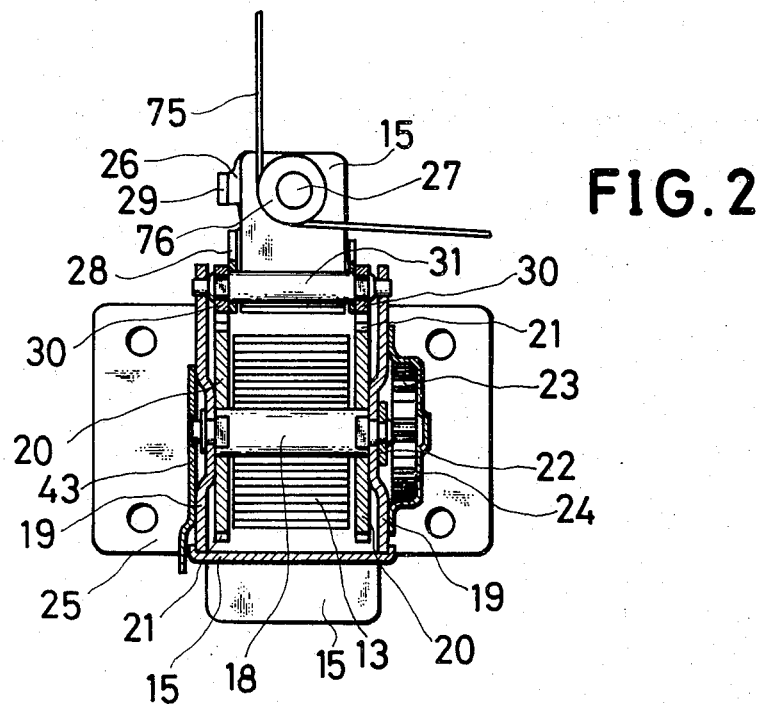
FIG. 2 is a cross-sectional view taken along the line 2—2 of FIG. 1.
Figure 5:
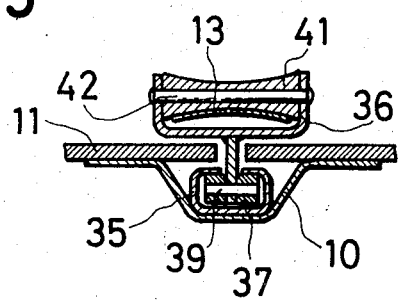
FIG. 5 is a cross-sectional view taken along the line 5—5 of FIG. 1.

Referring now particularly to FIGS. 1, 2 and 5 of the drawings, a vehicle door designated generally by the reference numeral 10 includes an inside wall 11, and a vehicle body is generally designated by the reference numeral 12. A safety seatbelt 13 is mounted at one end in a seatbelt reeling-up device generally indicated by the reference numeral 14, as will be described in detail hereinafter. The other end, not shown, of the seatbelt 13 is mounted rigidly upon a seat, not shown, or upon the floor, not shown, of the vehicle body 12.

The reeling-up device 14 includes case covers 15 and 16 mounted upon the door 10. The case cover 16 has an annular extending portion 17 which acts as a guide tube for the seatbelt 13. A shaft 18 extends through, and is rotatably supported by, a pair of apertured plates 19 (see FIG. 2), shaft 18 having a pair of ratchet wheels 20 mounted thereon. The outer peripheries of the ratchet wheels 20 are provided with a plurality of teeth 21. The ratchet wheels 20 are adapted to rotate with the shaft 18 by engaging the recessed ends of the shaft 18. The one end of the seatbelt 13 is secured to the shaft 18 by suitable means and thus the seatbelt 13 is fully wound upon the shaft 18 when it is fully retracted and is unwound from the shaft 18 when it is extended.

A spacer 22 (see FIG. 2), secured relative to shaft 18 and one end plate 19 prevents axial movement of the shaft 18. A clock spring 23 has its outer spiral anchored to an enclosing case 24, which is fixed to a base 25, which is, in turn, secured to the inside wall 11 of vehicle door 10 by suitable means, and its inner spiral engaged with the shaft 18, so that the shaft 18 is continually biased in a counter-clockwise or belt-retracting direction. A bracket 26 is secured to the case cover 15 by a pin 17 and comprises end portions 28 and 29. A pair of pawl members 30 are pivotally mounted upon portion 28 of the bracket 26 through means of a pivot pin 31 which is mounted within plates 19, the pawl members 30 being engaged with the recessed ends of the pin 31 so as to rotate together. Each of the pawl members 30 includes an extension 32 which extends toward the teeth 21 of the corresponding ratchet wheel 20 and is engageable therewith to lock and maintain movement of the reeling-up means 14 in a clockwise or belt-extending direction. Each of the pawl members 30 further includes an extension 33. A spring 34 engages the portion 29 of the bracket 26 at one end, and the extension 33 of one of the pawls 30 at its other end to bias the pawls 30 in the counter-clockwise direction, the extensions 32 therefore being biased into engagement with the teeth 21 of the ratchet wheels 20. Engagement between the teeth 21 and the extensions 32 thus blocks the seatbelt 13 from being pulled out.

Secured to the door 10 is a guide member 35 in which a seatbelt holder 36 is slidably supported. The holder 36 supports rollers 37 and 38 rotatably mounted thereon by pivot pins 39 and 40, these rollers 37 and 38 being adapted to rotate along the inside wall of the guide member 35. Another roller 41, is similarly rotatably mounted upon the holder 36 by means of a pivot pin 42, the seatbelt 13 passing between roller 41 and holder 36 (see FIG. 5). The relative position of the holder 36 is changed in response to the open or closed position of the door 10, as will be clear hereinafter, whereby the seatbelt 13 is brought into such a position that entering and leaving of the passenger is possible without substantial obstruction when the door 10 is opened, and the seatbelt 13 is securely positioned around the occupant when the door 10 is closed.

Figure 3:
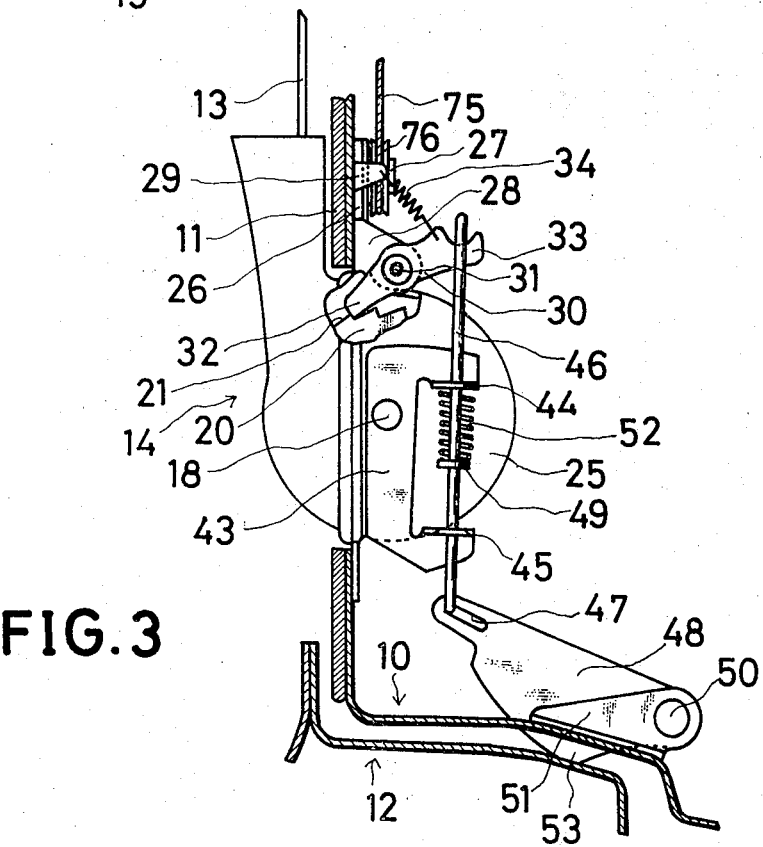
FIG. 3 is a view showing the locking means of the reeling-up means when the door is in its closed position.
Figure 4:
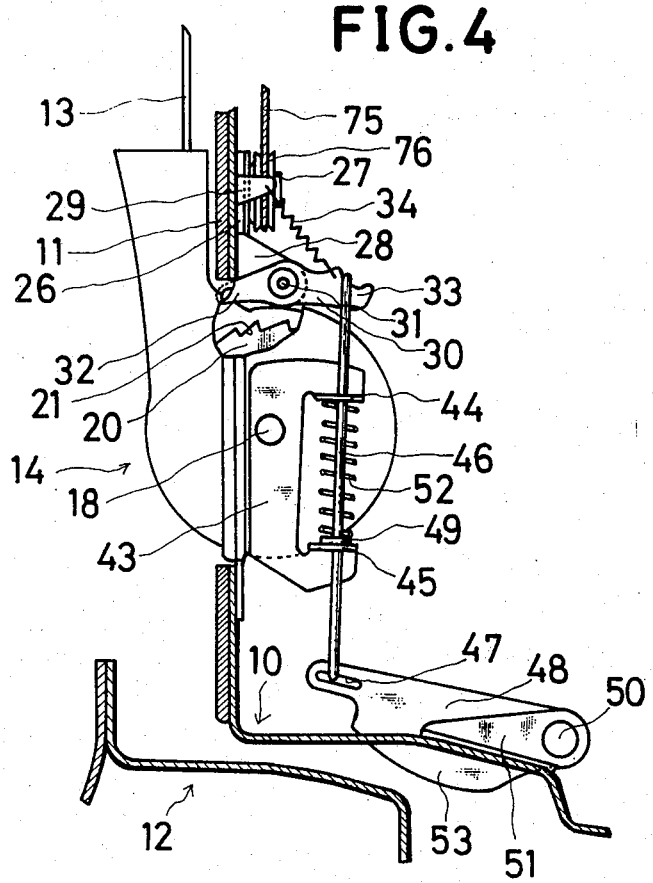
FIG. 4 is a view similar to FIG. 3, but showing the locking means of the reeling-up means when the door is in its opened position.

As best shown in FIGS. 3 and 4, a plate 43, fixed to the base 25, includes outwardly extending flanges 44 and 45 which are provided with openings. These openings act as supports for a rod 46 which is movable into and out of engagement with the pawl 30. The rod 46 includes an upper end engageable with the pawl 30, a lower end engaged with a groove 47 of a swing plate 48, and an intermediate large diameter portion 49 which acts as a retainer. The swing plate 48 has a pivot pin 50 so as to be pivotally mounted upon a fastener 51 which is secured to the inside wall 11 of the door 10. A coil spring 52 is inserted between the flange 44 and the retainer 49 so as to thereby bias the rod 46 downwardly. From the foregoing description, it is apparent that when the door 10 is closed, the swing plate 48 is moved to its locking position, as viewed in FIG. 3, wherein a lower surface 53 of the swing plate 48 is brought into engagement with the body 12 so that the plate 48 is pivoted around the pin 50 in a clockwise direction thus allowing the rod 46 to move in an upward direction opposite to the bias of spring 52. Thus, the rod 46 does not engage the pawl 30. When the door 10 is opened however, the swing plate 48 is displaced to its unlocking position, as viewed in FIG. 4, in which the surface 53 of the plate 48 disengages from the body 12. Therefore, the rod 46 engages the pawl 30, due to the downward biasing action of the spring 52, so as to cause the pawls 30 to disengage from the teeth 21 of the ratchet wheels 20.

Referring now to FIGS. 1, 6, 7 and 8 of the drawings, first and second arms 54 and 55 are pivotally mounted upon the door 10 by means of a pivot pin 56. A rod link 57, pivotally mounted upon a pillar 58 through means of a mounting block 59, secured to the pillar 58, and a pin 60, extends toward the first arm 54 for pivotally interconnecting the pillar 58 and the first arm 54. In addition, the first and second arms 54 and 55 are respectively provided with circular arc-shaped convex portions 61 and 62, as best shown in FIG. 8, in which a spring 63 is housed, both arms 55 and 56 thus being elastically connected to each other. The spring 63 also acts to compensate for errors in measurement in making the parts shown in FIG. 7.

A conventional hinge 64, which supports the door 10, is adapted to rotate around an axis 65 thereof. It is noted that there is a distance L between the axis 65 and the center of pivotal movement of the rod 57. Owing to the distance L, when the door 10 is opened, the rod 57 allows the first arm 54 to rotate around the pin 56 in a counter-clockwise direction and thence the second arm 55 is rotated, by means of the convex portions 61 and 62 and the spring 63 in the same direction. Rollers 66 and 67 are rotatably mounted upon the lower end of the second arm 55 by means of a pin 68. A cable 69 is rigidly fixed at one end upon the holder 36 and extends over rollers 70 and 71 mounted, respectively, upon the inside wall 11 of door 10 through means of pins 72 and 73, and the roller 66. The cable 69 is rigidly fixed, at the other end, upon the door 10 by a pin 74. Another cable 75, rigidly fixed at one end upon the holder 36, extends over a roller 76, mounted upon the case cover 15 through the pin 27, and the roller 67, and is rigidly mounted upon the door 10 by means of a pin 77. Thus, the position of the holder 36 is changed in response to the position of the arm 55.

In operation, assuming that the door 10 is in a closed position, each part of the seatbelt retractor is in the position shown in FIGS. 1, 3, 6 and 7. As the door 10 is opened, the swing plate 48 disengages from the body 12. The upper end of the rod 46 then engages the pawl 30 so as to cause the latter to rotate to an unlocking position as shown in FIG. 4. At the same time, the arm 55 is rotated in a counter-clockwise direction, as previously mentioned. This rotation of the arm 55 pulls the cable 69 and loosens the cable 75 so that the holder 36 is pulled up along the guide member 35. Upward movement of the holder 36 allows the seatbelt 13 to be extended against the spring 23 so that the passenger can get in and out of the vehicle without substantial obstruction.

Subsequently, during the closing of the door 10, the rod 57 allows both arms 54 and 55 to rotate in a clockwise direction. Therefore, the arm 55 pulls the cable 75 and loosens the cable 69 so that the holder 36 is slid down along the guide member 35. During the sliding movement of the holder 36, the seatbelt 13 is retracted under the action of the clock spring 23. When the door 10 is closed the swing plate 48 engages the body 12 for causing the pawls 30 to rotate to their locking positions. Accordingly, the extensions 32 of the pawls 30 engage the teeth 21 of the ratchet wheels 20 whereby the extension of the seatbelt 13 is locked in the fully retracted position and thus, the passenger is reliably secured and supported.

Various other modifications and variations of the present invention are obviously possible in light of the above teachings. It is to be understood, therefore, that within the scope of the appended claims, the invention may be practiced otherwise than as specifically described herein.

What is claimed as new and desired to be secured by letters patent of the United States is:

1. A seatbelt retractor for a vehicle having a vehicle body and a vehicle door hinged thereto comprising a seatbelt reeling-up means mounted on said door and having a rotatable shaft biased in a belt retracting direction, a seatbelt securable to said body at one end and mounted on said shaft at the other end, and a belt-extending locking means movable in response to the opening and closing movement of said door so as to automatically lock the movement of said reeling-up means when said door is closed, said locking means comprising ratchet wheel means rotatably mounted on said shaft, pawl means engageable with said ratchet wheel means, control means mechanically connected to said pawl means thereby controlling engagement of said pawl with said ratchet wheel means, and mechanical means connected to said control means and adapted to releasably engage the vehicle body in association with the movement of said door, whereby said mechanical means actuated by disengagement from the vehicle body in response to the opening movement of said door controls said control means to thereby disengage said pawl from said ratchet wheel means and said mechanical means actuated by engagement with said vehicle body in response to the closing movement of said door controls said control means to thereby complete engagement of said pawl with said ratchet wheel means.

2. A seatbelt retractor as set forth in claim 1, further comprising a holder for said seatbelt slidably mounted upon said door and means for changing the relative position of said holder in response to the opened and closed position of said door.

3. A seatbelt retractor as set forth in claim 1, wherein said locking means further comprises a spring which urges said pawl means into a locking position and said control means comprises a spring biased rod member movable between a locking position wherein said rod member disengages from said pawl means and an unlocking position wherein said rod member causes said pawl means to disengage from said ratchet wheel means opposite to said spring for urging said pawl means.

4. A seatbelt retractor as set forth in claim 2, wherein said means for changing the relative position of said holder includes arm means rotatable proportional to the opening and closing movement of said door and cable means extended through said arm means, one end of said cable means being secured to said holder and the other end of said cable means being secured to said door.

5. A seatbelt retractor as set forth in claim 4, wherein said arm means includes a pair of arms elastically connected to each other.

* * * * *